United States Patent
Morihiro et al.

(10) Patent No.: US 10,484,917 B2
(45) Date of Patent: Nov. 19, 2019

(54) HANDOVER CONTROLLER COMMUNICATION APPARATUS

(71) Applicant: NTT DOCOMO, INC., Tokyo (JP)

(72) Inventors: Yoshifumi Morihiro, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/082,778

(22) PCT Filed: Feb. 15, 2017

(86) PCT No.: PCT/JP2017/005450
§ 371 (c)(1),
(2) Date: Sep. 6, 2018

(87) PCT Pub. No.: WO2017/154486
PCT Pub. Date: Sep. 14, 2017

(65) Prior Publication Data
US 2019/0116532 A1  Apr. 18, 2019

(30) Foreign Application Priority Data
Mar. 11, 2016 (JP) .................................. 2016-048750

(51) Int. Cl.
*H04W 36/00* (2009.01)
*H04W 36/04* (2009.01)
(Continued)

(52) U.S. Cl.
CPC ....... *H04W 36/04* (2013.01); *H04W 36/0061* (2013.01); *H04W 36/0085* (2018.08); *H04W 36/30* (2013.01); *H04W 36/38* (2013.01)

(58) Field of Classification Search
CPC . H04W 36/04; H04W 36/38; H04W 36/0085; H04W 36/30; H04W 36/0061
(Continued)

(56) References Cited

U.S. PATENT DOCUMENTS

2011/0007651 A1* 1/2011 Kataoka ................ H04W 36/30
370/252
2011/0051687 A1* 3/2011 Nakasato ............. H04W 36/30
370/331

FOREIGN PATENT DOCUMENTS

JP  2008-270990 A  11/2008
JP  2016-021620 A   2/2016
(Continued)

OTHER PUBLICATIONS

International Search Report issued in PCT/JP2017/005450 dated May 16, 2017 (7 pages).
(Continued)

*Primary Examiner* — Amancio Gonzalez
(74) *Attorney, Agent, or Firm* — Osha Liang LLP

(57) ABSTRACT

A communication apparatus in a wireless communication system in which a plurality of cells with different bands are overlaid and which includes the communication apparatus and a user equipment include: an acquisition unit configured to acquire communication quality of the user equipment in a first cell in which the user equipment resides; a determination unit configured to determine whether to perform the switch to a second cell overlaid with the first cell based on the communication quality of the user equipment; and an instruction unit configured to instruct the user equipment to perform the switch to the second cell when the switch to the second cell overlaid with the first cell is determined.

8 Claims, 14 Drawing Sheets

(51) Int. Cl.
    *H04W 36/30*    (2009.01)
    *H04W 36/38*    (2009.01)
(58) Field of Classification Search
    USPC .......................................... 455/436
    See application file for complete search history.

(56) References Cited

FOREIGN PATENT DOCUMENTS

| WO | 2008/096702 A1 | 8/2008 |
| WO | 2009/110103 A1 | 9/2009 |
| WO | 2015125053 A1 | 8/2015 |

OTHER PUBLICATIONS

Written Opinion of the International Searching Authority issued in PCT/JP2017/005450 dated May 16, 2017 (4 pages).
"Docomo 5G white paper", Sep. 2014, NTT Docomo, Internet URL: https://www.nttdocomo.co.jp/corporate/technology/whitepaper_5g/ (27 pages).
Office Action issued in counterpart Japanese Patent Application No. 2016-048750, dated May 28, 2019 (10 pages).
Extended European Search Report issued in the counterpart European Patent Application No. 17762829.4, dated Nov. 19, 2018 (9 pages).
Nokia Networks et al.; "Considerations on 3G-WLAN interworking"; 3GPP TSG-RAN WG3 Meeting #87bis R3-150878; Santa Cruz, Spain, Apr. 20-24, 2015 (4 pages).

* cited by examiner

FIG.4

| CELL | OVERLAID CELL |
|---|---|
| A1 | B1, B2, B3, C1, C2, C3 |
| B1 | A1, C1 |
| B2 | A1, C2 |
| B3 | A1, C3 |
| C1 | A1, B1 |
| C2 | A1, B2 |
| C3 | A1, B3 |

FIG.5

| CELL | THROUGHPUT |
|---|---|
| A1 | 20 Mbps |
| B1 | 1 Mbps |
| B2 | 5 Mbps |
| B3 | 2 Mbps |
| C1 | 15 Mbps |
| C2 | 10 Mbps |
| C3 | 5 Mbps |

FIG.6A

| SWITCHING SOURCE CELL | | | SWITCHING DESTINATION CELL | |
|---|---|---|---|---|
| | IDENTIFIER | RECEPTION QUALITY | IDENTIFIER | COMMUNICATION QUALITY (THROUGHPUT) |
| A/B | CELL B1 | 2 | CELL A1 | 10 Mbps |
| A/B | CELL B1 | 2 | CELL C1 | 20 Mbps |
| C | CELL B1 | 1 | CELL C3 | 30 Mbps |
| C | CELL B1 | 1 | CELL A1 | 10 Mbps |
| D | CELL B1 | 1 | CELL C2 | 15 Mbps |
| D | CELL B1 | 1 | CELL A1 | 10 Mbps |

FIG.6B

| | SWITCHING SOURCE CELL | | | SWITCHING DESTINATION CELL | |
|---|---|---|---|---|---|
| | IDENTIFIER | RECEPTION QUALITY | NEIGHBORING CELL (RECEPTION QUALITY) | NEIGHBORING CELL (RECEPTION QUALITY) | IDENTIFIER | COMMUNICATION QUALITY (THROUGHPUT) |
| A | CELL B1 | 2 | — | — | CELL A1 | 10 Mbps |
| B | CELL B1 | 2 | CELL B3(1) | — | CELL C1 | 20 Mbps |
| C | CELL B1 | 1 | CELL B2(1) | CELL B3(1) | CELL C3 | 30 Mbps |
| C | CELL B1 | 1 | CELL B2(1) | CELL B3(1) | CELL A1 | 10 Mbps |
| D | CELL B1 | 1 | CELL B2(1) | — | CELL C2 | 15 Mbps |
| D | CELL B1 | 1 | CELL B2(1) | — | CELL A1 | 10 Mbps |

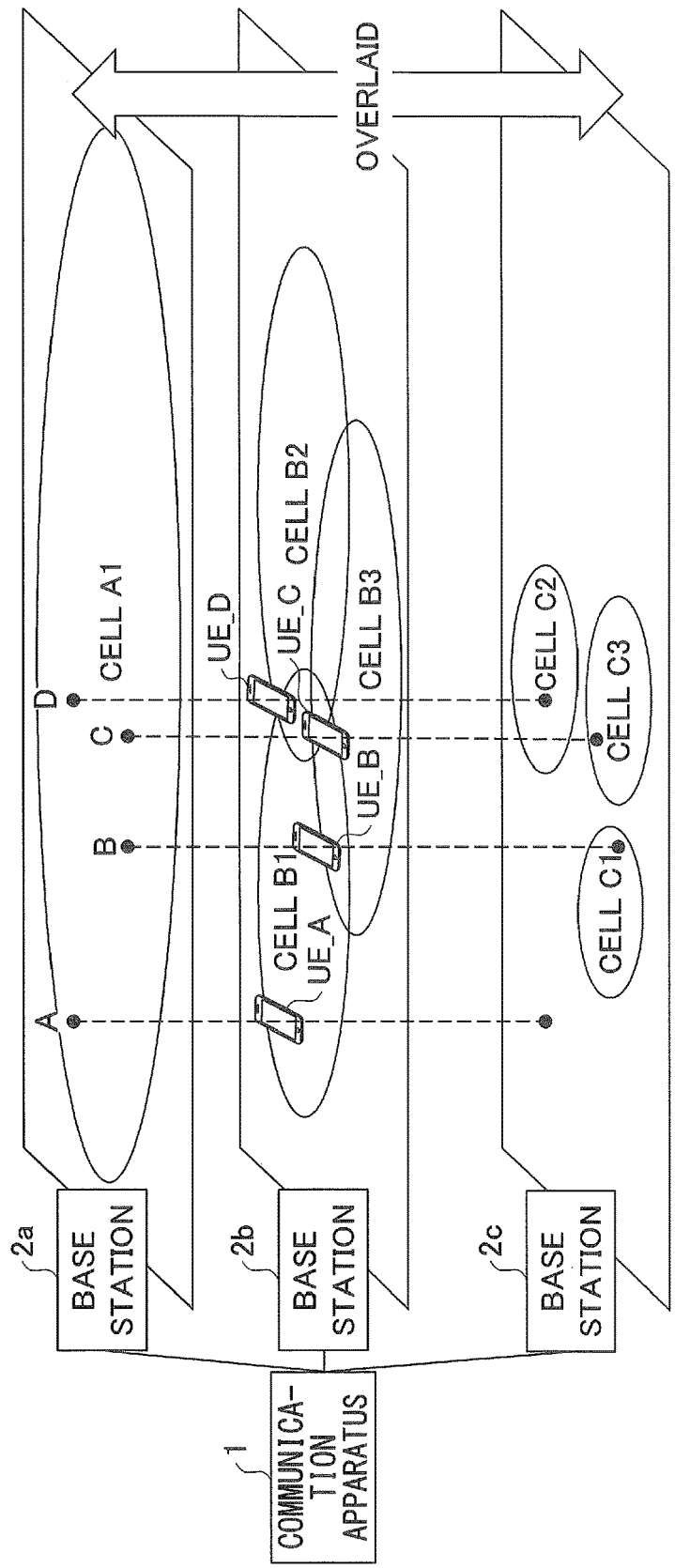

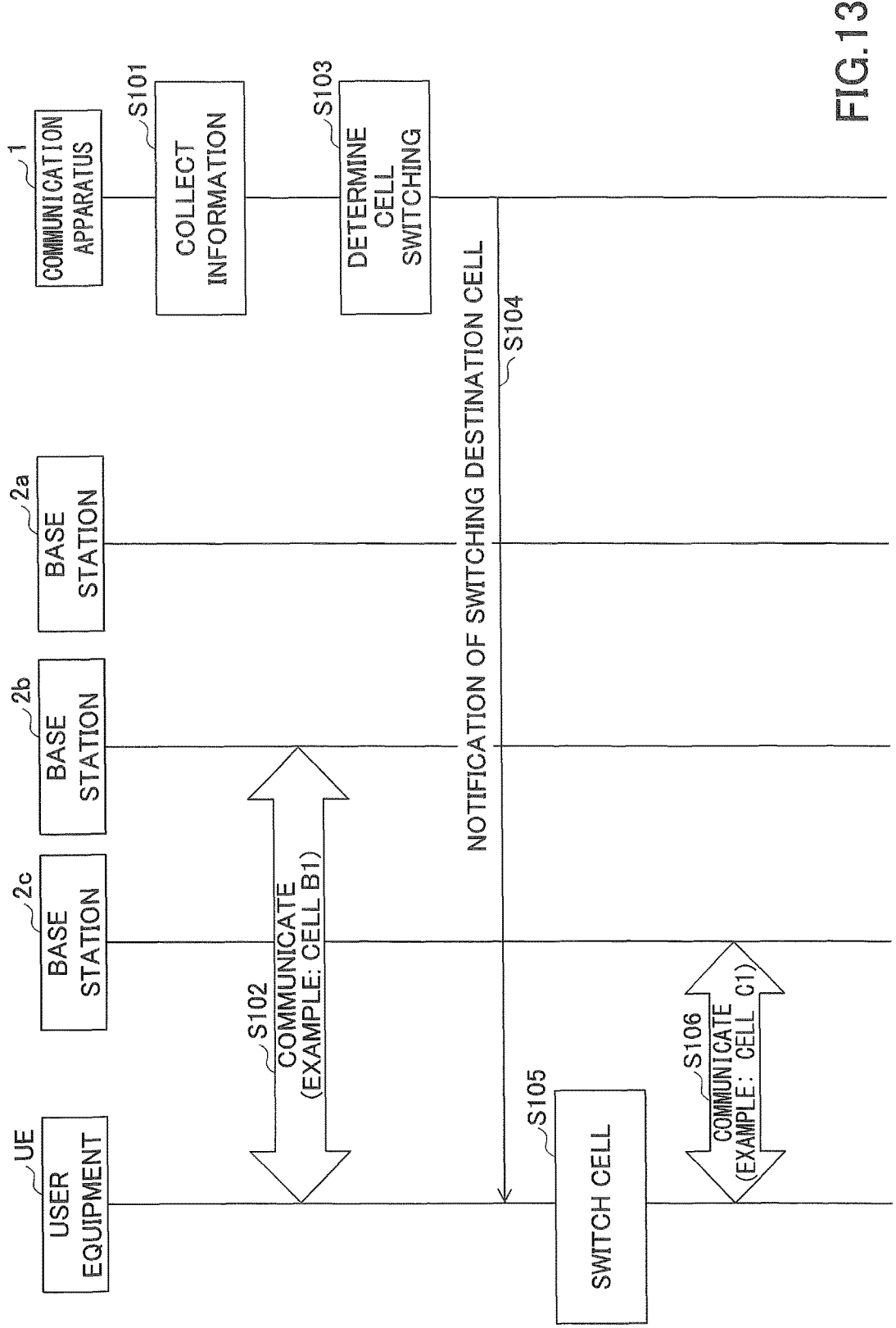

FIG.14A

| TIME | THROUGHPUT |
|---|---|
| a SECONDS TO b SECONDS | 50 Mbps |
| ... | ... |
| x SECONDS TO y SECONDS | 1 Mbps |
| ... | ... |

FIG.14B

| TIME | COMMUNICATION QUALITY (CQI) |
|---|---|
| a SECONDS TO b SECONDS | 15 |
| ... | ... |
| x SECONDS TO y SECONDS | 3 |
| ... | ... |

FIG.15

| IMSI | COMMUNICATION SCHEME, PREFERENTIAL BAND |
|---|---|
| A | WIRELESS LAN |
| B | LTE, 800 MHz BANDWIDTH |
| C | 5 G, 10 GHz BANDWIDTH |
| ... | ... |

HANDOVER CONTROLLER COMMUNICATION APPARATUS

TECHNICAL FIELD

The present invention relates to a communication apparatus.

BACKGROUND ART

In long term evolution (LTE), wireless communication schemes called 5G have been discussed to realize larger capacity of systems, further acceleration of data transmission speeds, further low delaying of wireless sections, and the like.

For example, component technologies for enabling a large number of terminals to perform data transmission via 5G wireless networks have been discussed to correspond to a service represented by Internets of things (IoT). Further, various component technologies have been discussed to satisfy required conditions that delay of a wireless section is set to be equal to or less than 1 ms while realizing a throughput equal to or greater than 10 Gpbs.

CITATION LIST

Non-Patent Document

Non-Patent Document 1: NTT Docomo, INC. "Docomo 5G White Paper", September 2014

SUMMARY OF THE INVENTION

Problem to be Solved by the Invention

Wireless communication systems in which cells configured with a plurality of bands (including the same communication schemes or different communication schemes) are overlaid diversely is assumed to be realized to realize 5G. An example of such a wireless communication system is illustrated in FIG. 1. In the wireless communication system illustrated in FIG. 1, 5G cells using a 10 GHz bandwidth, LTE cells using an 800 MHz bandwidth, and wireless LAN cells using a 5 GHz bandwidth are overlaid. Thus, user equipments perform communication while switching these cells variously.

Here, before carrier aggregation is introduced, user equipments generally have a function capable of performing transmission and reception with only a single band basically. This is because when user equipments have the function capable of simultaneously transmitting and receiving a plurality of bands, functions of the user equipments are complicated and manufacturing costs or the like of the user equipments increase.

Bandwidths of bands used for 5G are scheduled to be considerably expanded (a few of 100 MHz to 1 GHz), compared to LTE bands (maximum 20 MHz). Accordingly, there is a possibility that the carrier aggregation technology for gaining a bandwidth by binding bands with narrow bandwidths is positively not used in a generation in which 5G is realized. Then, in the generation in which 5G is realized, as in before an introduction of the carrier aggregation, user equipments are assumed to return to a direction in which a function capable of performing transmission and reception with only a single band basically.

Next, to perform a cell switching process such as handover, user equipments periodically measure qualities of neighboring cells. When user equipments measure qualities with bands different from bands of cells during communication, it is necessary to perform a process of switching a frequency (band) in a receiver. When a frequency (band) is switched, communication in the cells during communication is interrupted. Therefore, user equipments attempt to measure qualities of neighboring cells with the same bands as the bands during communication basically. That is, when communication quality deteriorates in cells during communication, user equipments basically switch the cells to other cells in the bands during communication.

Then, when wireless communication systems in which cells configured with a plurality of bands are overlaid diversely are realized, there is a possibility that user equipments do not sufficiently ensure chances to perform cells of bands other than the bands during communication. For example, in the example of FIG. 1, it is assumed that a user equipment (UE) residing in a cell B1 moves to a cell B2. In the example of FIG. 1, a movement destination of the user equipment is overlaid with cells A1 and C2 other than the cell B2. Depending on a communication situation or characteristic of each cell, a case is also assumed in which the user equipment performs communication in which a band is not necessarily switched to the cell B2, but is switched to the cell A1 or C2. However, as described above, a user equipment may not handle a case in which to switch a band to another cell in the same band basically, it is proper to switch the band to a cell of a band other than a band during communication.

The technology of the disclosure is devised in view of the forgoing circumstance and the invention is to provide a technology for enabling switch to a cell to be properly performed in a wireless communication system in which a plurality of cells are overlaid.

Means for Solving Problem

According to the technology of the disclosure, a communication apparatus in a wireless communication system in which a plurality of cells with different bands are overlaid and which includes the communication apparatus and a user equipment includes: an acquisition unit configured to acquire communication quality of the user equipment in a first cell in which the user equipment resides; a determination unit configured to determine whether to perform switching to a second cell overlaid with the first cell based on the communication quality of the user equipment; and an instruction unit configured to instruct the user equipment to perform the switching to the second cell when the switching to the second cell overlaid with the first cell is determined.

Effect of the Invention

According to the technology of the present disclosure, there is provided a technology for enabling switching to a cell to be properly performed in a wireless communication system in which a plurality of cells are overlaid.

BRIEF DESCRIPTION OF DRAWINGS

FIG. 4 is a diagram illustrating an example of overlay information;

FIG. 5 is a diagram illustrating an example of communication quality information;

FIG. 6A is a diagram illustrating an example of cell switching history information;

FIG. 6B is a diagram illustrating an example of cell switching history information;

FIG. 7 is a diagram for describing the cell switching history information;

FIG. 13 is a sequence diagram illustrating an example of a processing procedure performed by the wireless communication system according to the embodiment;

FIG. 14A is a diagram illustrating an example of a change in a communication situation; and FIG. 14B is a diagram illustrating an example of a change in a communication situation; and FIG. 15 is a diagram illustrating an example of contract information.

MODE(S) FOR CARRYING OUT THE INVENTION

Hereinafter, embodiments of the invention will be described with reference to the drawings. The embodiments to be described below are merely examples and embodiments to which the invention is applied are limited to the following embodiments. For example, a wireless communication system according to the embodiments is assumed to be a system of a scheme conforming to LTE. However, the invention is not limited to LTE, but other schemes can also be applied. In the present specification and the claims, "LTE" is used as broad meanings including not only a communication scheme corresponding to release 8 or 9 of 3GPP but also a 5th-generation communication scheme corresponding to releases subsequent to releases 10, 11, 12, and 13, or release 14 of 3GPP.

In the embodiments, "switching a cell" is used as meanings including handover and cell reselection.

<System Configuration>

Figure 1:
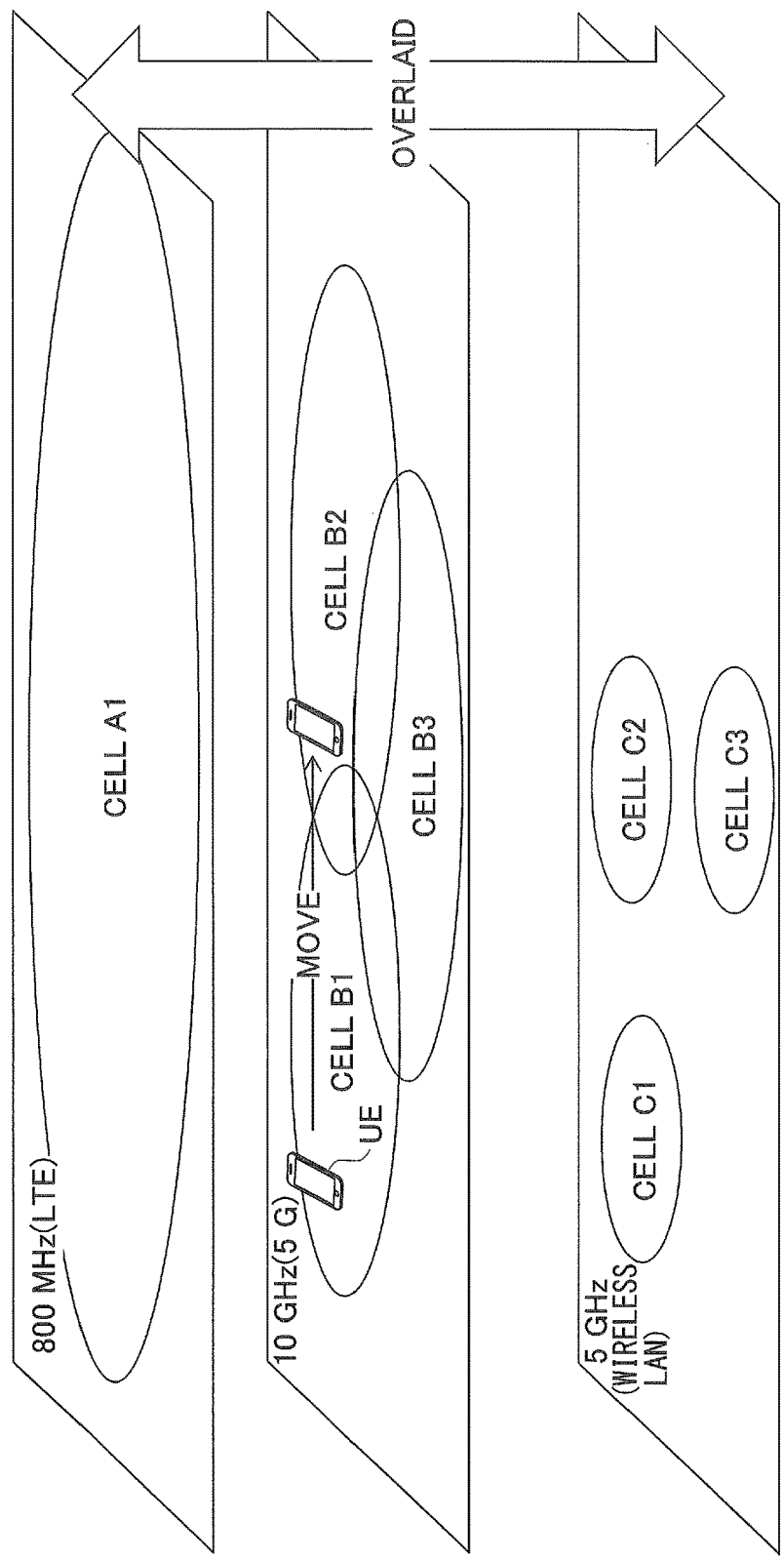
FIG. 1 is a diagram illustrating an example of a configuration in which a plurality of cells are overlaid diversely.
Figure 2:
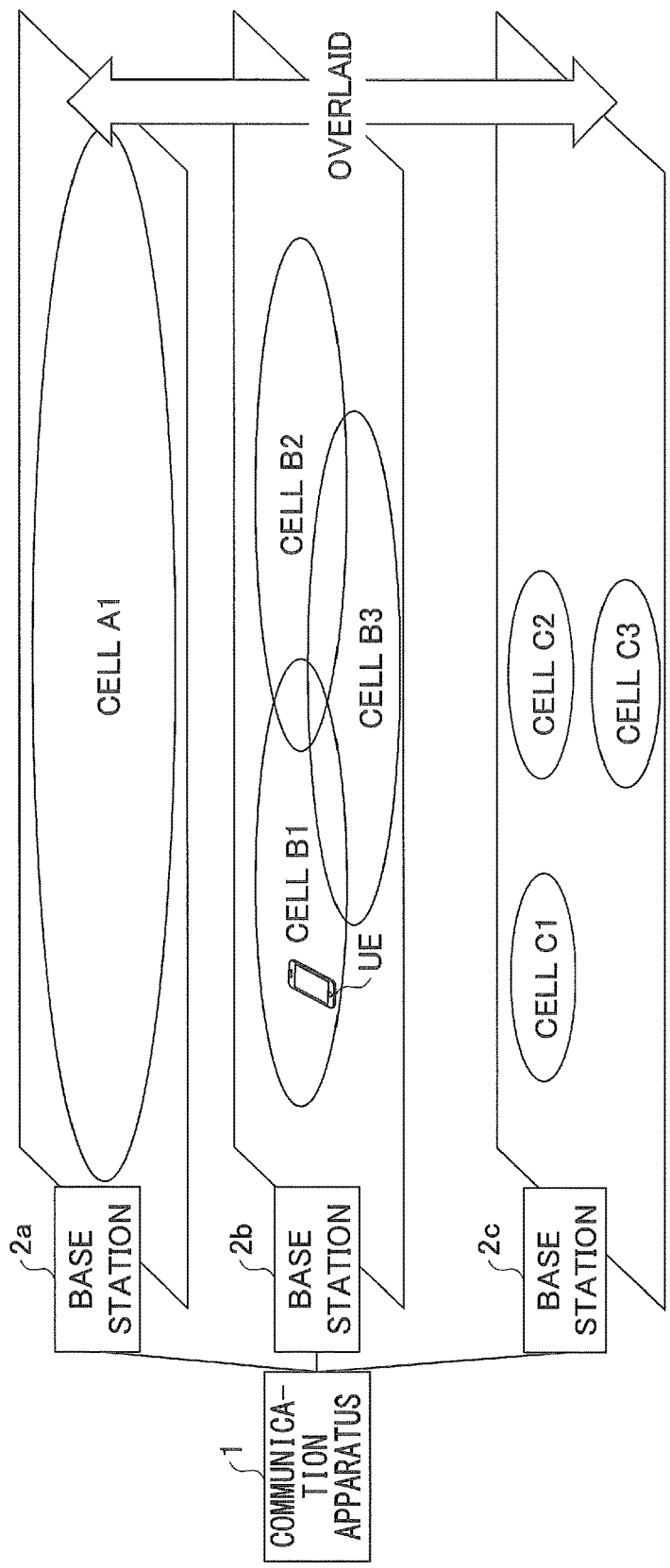
FIG. 2 is a diagram illustrating a system configuration example of a wireless communication system according to an embodiment.

FIG. 2 is a diagram illustrating a system configuration example of a wireless communication system according to an embodiment. The wireless communication system according to the embodiment includes a communication apparatus 1, a base station 2a, a base station 2b, a base station 2c, and a user equipment UE. In the following description, when the base station 2a, the base station 2b, and the base station 2c are not distinguished from each other, the base station 2a, the base station 2b, and the base station 2c are referred to as the "base stations 2." In FIG. 2, one user equipment UE is illustrated. However, there are a plurality of user equipments UE in the wireless communication system for convenience.

The base station 2a forms a cell A1, the base station 2b forms a cell B1, a cell B2, and a cell B3, and the base station 2c forms a cell C1, a cell C2, and a cell C3. The cell A1, the cells B1 to B3, and the cells C1 to C3 are assumed to be cells having different bands. The different bands may be specifically any kinds of bands. As an example of a combination, the cell A1 may have an 800 MHz bandwidth, the cells B1 to B3 may have a 10 GHz bandwidth, and the cells C1 to C3 may have a 5 GHz bandwidth. In FIG. 2, the cells of 3 bands are overlaid. The wireless communication system may be configured such that cells of 4 or more bands are overlaid or may be configured such that cells of 2 bands are overlaid.

In the embodiment, communication schemes used for the bands may be the same communication scheme or may be different communication schemes. The communication scheme used for each band may be any communication scheme. For example, an LTE scheme, a 5G scheme, a wireless LAN scheme, or WiGig (IEEE 802.11ad) is used. As an example of the combination, for example, the LTE scheme may be used or the 5G scheme may be used in the cell A1, the cells B1 to B3, and the cells C1 to C3. The LTE scheme may be used in the cell A1, the 5G scheme may be used in the cells B1 to B3, and the wireless LAN scheme may be used in the cells C1 to C3.

The communication apparatus 1 communicates with the base stations 2 and the user equipment UE and has a function of giving an instruction to the cell of a switching destination based on communication quality or the like of the user equipment UE. The communication apparatus 1 may be, for example, a switch (for example, an MME), or may be a subscriber management apparatus (for example, an HSS) that manages subscribers, or may be a server connected to a switch. In the embodiment, each function of the communication apparatus 1 may be mounted on the base station 2.

<Functional Configuration>

(Communication Apparatus)

Figure 3:
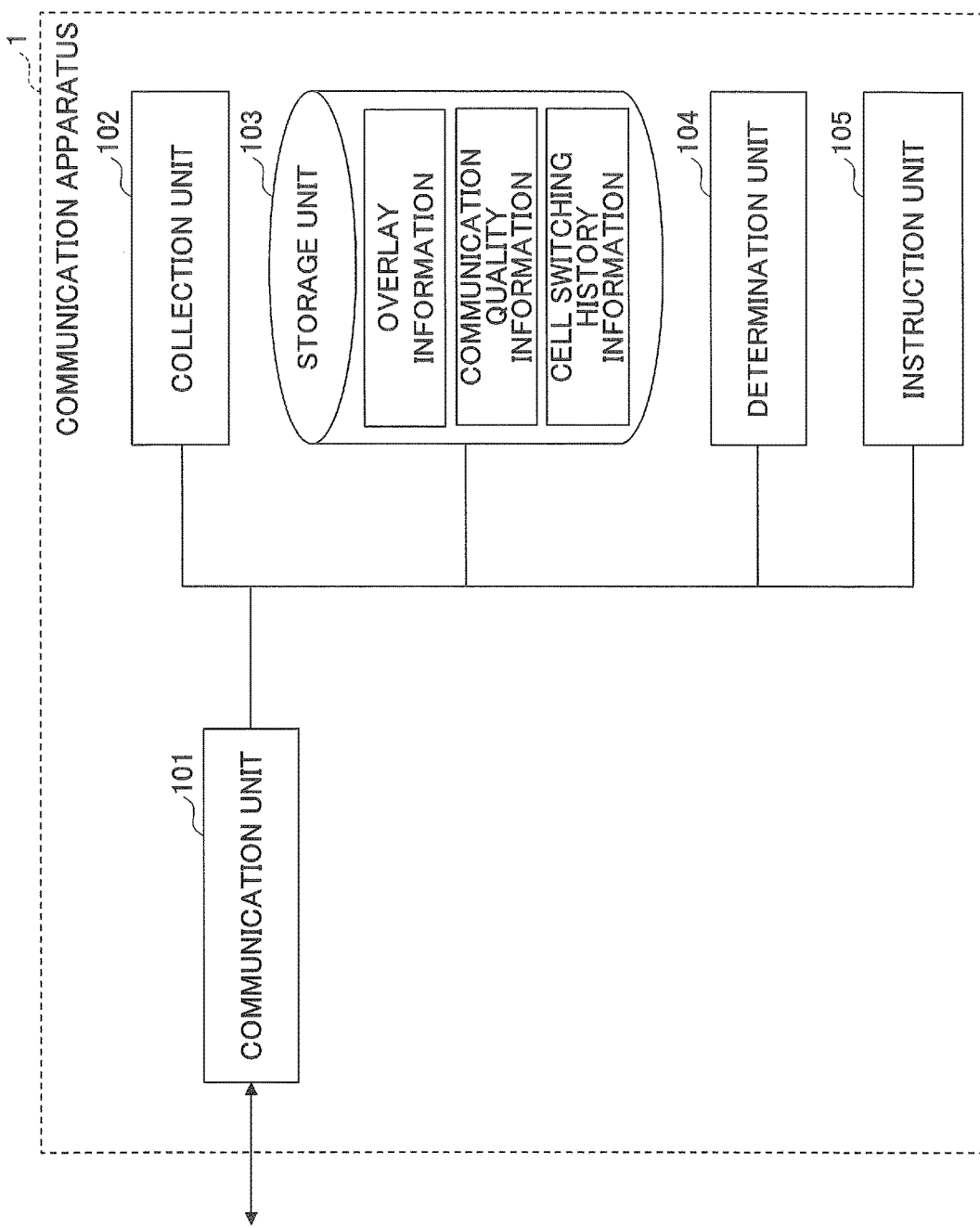
FIG. 3 is a diagram illustrating a functional configuration example of a communication apparatus according to the embodiment.

FIG. 3 is a diagram illustrating a functional configuration example of a communication apparatus according to the embodiment. As illustrated in FIG. 3, the communication apparatus 1 includes a communication unit 101, a collection unit 102, a storage unit 103, a determination unit 104, and an instruction unit 105. FIG. 3 illustrates only main functional units according to the embodiment. For example, functions (not illustrated) of performing operations in conformity to a communication scheme such as LTE, 5G, or a wireless LAN are also included. Here, some of processes (for example, a specific one modification example, a plurality of modification examples, or only a specific example) of the communication apparatus 1 described in "<Processing Procedure>" to be described below may be executable.

The communication unit 101 has a function of communicating with the base stations 2 and a function of communicating with the user equipment UE via the base station 2.

The collection unit 102 has a function of collecting communication quality (for example, a throughput) of the user equipment UE in a cell in which the user equipment UE resides. The collection unit 102 stores the collected communication quality of the user equipment UE in "communication quality information" indicating communication quality of each cell in which there is the wireless communication system. The collection unit 102 may be referred to as an acquisition unit. A specific example of the communication quality information will be described later.

The collection unit 102 collects "cell switching history information" indicating a communication situation changed in a cell of a switching destination when the user equipment UE present in the wireless communication system previously performs switching to a cell, and then stores the cell switching history information in the storage unit 103. A specific example of the cell switching history information will be described later.

The storage unit 103 stores "overlay information" indicating a combination in which the cells present in the wireless communication system are overlaid. The overlay information will be described later. The storage unit 103 stores the "communication quality information" and the "cell switching history information."

The determination unit 104 has a function of giving an instruction to a cell of a switching destination based on the communication quality or the like of the user equipment UE.

The instruction unit 105 has a function of instructing the user equipment UE to switch to a cell determined by the determination unit 104. This instruction may be given using any message. For example, RRC signaling may be used, NAS signaling may be used, or a new protocol may be used.

(Overlay Information)

FIG. 4 is a diagram illustrating an example of overlay information. The overlay information indicates a combination in which the cells present in the wireless communication are overlaid. The overlay information illustrated in FIG. 4 corresponds to the cell configuration in FIG. 2.

In FIG. 4, an "overlaid cell" indicates a cell overlaid (overlapped) with a "cell." For example, the "overlaid cell" indicates that the cell A1 is overlaid with the cells B1, B2, B3, C1, C2, and C3.

(Communication Quality Information)

FIG. 5 is a diagram illustrating an example of the communication quality information. In the communication quality information, a throughput (average throughput) of each user equipment UE is stored as the communication quality of each cell for a predetermined period (for example, recent 10 seconds or past 1 hour). In the example of FIG. 5, a throughput for a predetermined period in the cell A1 indicates 20 Mbps. For example, the collection unit 102 of the communication apparatus 1 may acquire the throughputs of the user equipments UE from the base station 2 and may store an average value of the acquired throughputs of the plurality of user equipments UE in the communication quality information. When the communication apparatus 1 is a switch, the collection unit 102 may acquire the throughputs of the user equipments UE from traffics flowing in the communication apparatus 1 and may store an average value of the acquired throughputs of the plurality of user equipments UE in the communication quality information.

(Cell Switching History Information)

FIGS. 6A and 6B are diagrams illustrating an example of the cell switching history information. Information indicating a communication situation changed in a cell of a switching destination when the user equipment UE present in the wireless communication system previously performs switching to a cell is stored as a history in the cell switching history information. More specifically, as illustrated in FIG. 6A, reception quality of a switching source cell and communication quality of a switching destination cell are associated and stored in the cell switching history information. The reception quality of the switching source cell may be, for example, reception quality (signal to noise ratio (SNR), signal to interference pulse noise ratio (SINR), a receiving signal received power (RSRP), receiving signal received quality (RSRQ), and channel quality indicator (CQI)) of DL measured by the user equipment UE. A measured value of the reception quality of DL may be stored without change or a value quantized with a predetermined level may be stored. The examples of FIGS. 6A and 6B illustrate a case in which quantized values are stored. The communication quality of the switching destination cell may be, for example, an average throughput for a predetermined period immediately after cell switching (for example, 10 seconds or the like immediately after cell switching) or may be a cell switching completion ratio in each user equipment UE for a predetermined period (for example, one week). Also, both the average throughput and the cell switching completion ratio may be included.

As illustrated in FIG. 6B, reception quality of a switching source cell, reception quality of a neighboring cell (a neighboring cell with the same band) measured by each user equipment UE at the time of switching from the switching source cell to the switching destination cell, and communication quality of the switching destination cell may be associated and stored in the cell switching history information.

Here, signs "A" to "D" assigned on the left side of each record in FIGS. 6(*a*) and 6(*b*) correspond to signals "A" to "D" illustrated in FIG. 7. For example, the user equipment UE residing at a position of "A" in the cell B1 in FIG. 7 can be switched to the cell A1 overlaid with the cell B1. The user equipment UE residing at a position of "B" in the cell B1 can be switched to one of the cell A1 or the cell C1 overlaid with the cell B1. In the cell switching history information with a format illustrated in FIG. 6B, the switching source cell and the switching destination cell are simply and merely recorded in the history. Therefore, a history of the user equipment UE residing at the position "A" in the cell B1 and a history of the user equipment UE residing at the position of "B" in the cell B1 are recorded at the same record.

On the other hand, in the cell switching history information with the format illustrated in FIG. 6B, reception quality of a neighboring cell measured by the user equipment UE at the time of switching the cell is recorded in addition to the switching source cell. Therefore, the history of the user equipment UE residing at the position "A" in the cell B1 and a history of the user equipment UE residing at the position of "B" in the cell B1 are recorded at different records. That is, in the switching history information with the format illustrated in FIG. 6B, the position of the user equipment UE before the switching can be reflected with higher precision than in the switching history information with the format illustrated in FIG. 6A.

(Base Station)

Figure 8:
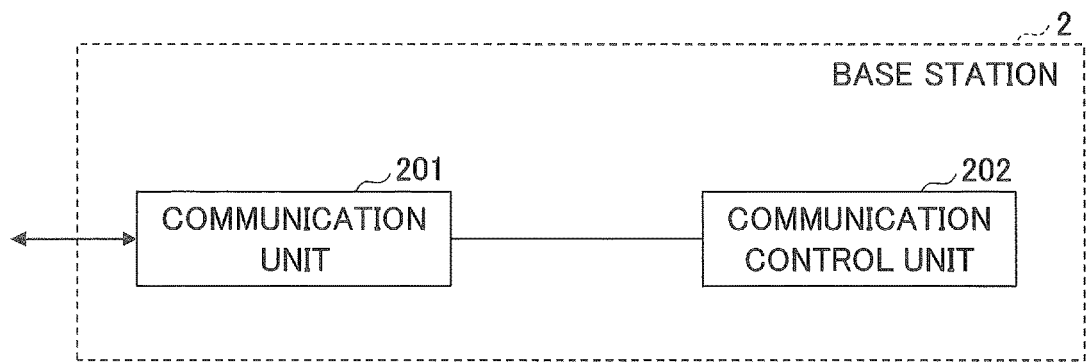
FIG. 8 is a diagram illustrating a functional configuration example of a base station according to the embodiment.

FIG. 8 is a diagram illustrating a functional configuration example of the base station according to the embodiment. As illustrated in FIG. 8, the base station 2 includes a communication unit 201 and a communication control unit 202. FIG. 4 illustrates only main functional units according to the embodiment. For example, functions (not illustrated) of performing operations in conformity to a communication scheme such as LTE, 5G, or a wireless LAN are also included. Here, some of processes (for example, a specific one modification example, a plurality of modification examples, or only a specific example) of the communication apparatus 1 described in "<Processing Procedure>" to be described below may be executable.

The communication unit 201 has a function of communicating with the user equipment UE via a wireless line and a function of communicating with the communication apparatus 1 via a wired line (or a wireless line).

The communication control unit 202 has various functions of controlling communication related to communication schemes supported by the base stations 2. For example, when the base station 2 supports LTE, the functions includes a function of performing various functions of Layer 1 to Layer 3 in LTE, a function of transmitting and receiving various messages to and from the base stations 2, and various functions of communicating switches (an MME and an SGW).

The communication control unit 202 may have a function of measuring reception quality (for example, SNR, SINR, RSRP, or RSRQ) of an uplink signal transmitted from the user equipment UE and reporting to (transmitting to) the communication apparatus 1 the reception quality. The communication control unit 202 may have a function of measuring (or estimating) a throughput between the user equipment UE and the base station 2 and reporting to the communication apparatus 1 the throughput.

(User Equipment)

Figure 9:
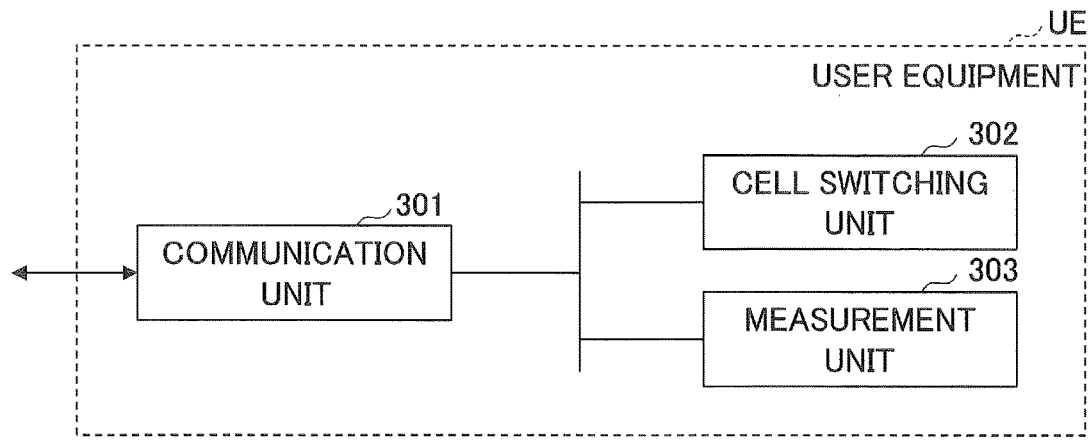
FIG. 9 is a diagram illustrating a functional configuration example of a user equipment according to the embodiment.

FIG. 9 is a diagram illustrating a functional configuration example of a user equipment according to the embodiment. As illustrated in FIG. 9, the user equipment UE includes a communication unit 301, a cell switching unit 302, and a measurement unit 303. FIG. 9 illustrates only main functional units according to the embodiment. For example, functions (not illustrated) of performing operations in conformity to a communication scheme such as LTE, 5G, or a wireless LAN are also included.

The communication unit 301 has a function of communicating with the base station 2 via a wireless line and a function of communication with the communication apparatus 1 via the base station 2. Here, some of processes (for example, a specific one modification example, a plurality of modification examples, or only a specific example) of the communication apparatus 1 described in "<Processing Procedure>" to be described below may be executable.

The cell switching unit 302 has a function of switching a cell in which the user equipment UE resides to a cell instructed from a current cell based on an instruction from the communication apparatus 1.

The measurement unit 303 has a function of measuring reception quality (reception quality of a downlink) of a cell in which the user equipment UE resides and reporting to the base station 2 or the communication apparatus 1 the reception quality. The reception quality measured by the measurement unit 303 is, for example, SNR, SINR, RSRP, RSRQ, or a channel quality indicator (CQI). The measurement unit 303 may have a function of measuring reception quality (reception quality of a downlink) of a neighboring cell with same band to the cell in which the user equipment UE resides and reporting to the base station 2 or the communication apparatus 1 the reception quality.

<Hardware Configuration>

(Communication Apparatus)

Figure 10:
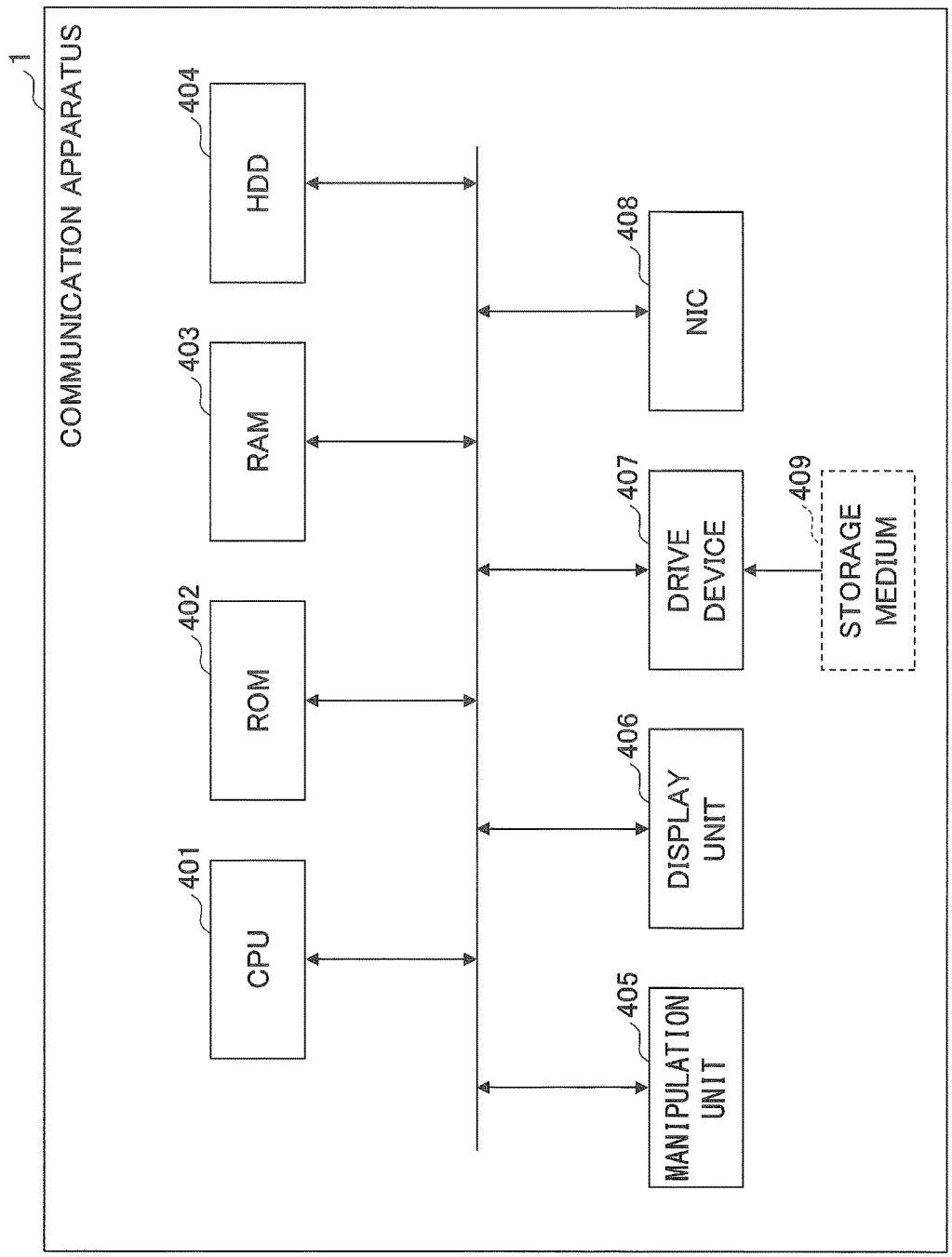
FIG. 10 is a diagram illustrating a hardware configuration example of a communication apparatus according to the embodiment.

FIG. 10 is a diagram illustrating a hardware configuration example of a communication apparatus according to the embodiment. The communication apparatus 1 according to the embodiment includes a CPU 401, a ROM 402, a RAM 403, an HDD 404, a manipulation unit 405, a display unit 406, a drive device 407, and a network interface card (NIC) 408.

The CPU 401 is a processor that controls the entire communication apparatus 1. The CPU 401 realizes various functions of the communication apparatus 1 by executing an operating system, applications, and programs of various services or the like stored in the HDD 404. The ROM 402 stores various programs or data or the like used by the programs. The RAM 403 is used as a storage region to which a program is loaded or a work area of the loaded program. The HDD 404 stores various kinds of information and programs.

The manipulation unit 405 is hardware that receives an input manipulation from a user and is, for example, a keyboard or a mouse. The display unit 406 is hardware that performs display for the user.

The drive device 407 reads a program from a storage medium 409 that records a program. The program read by the drive device 407 is installed in, for example, the HDD 404. NIC 408 is a communication interface that connects the communication apparatus 1 to a network to transmit and receive data.

The storage medium 409 refers to a non-transitory storage medium. Examples of the storage medium 409 include a magnetic storage medium, an optical disc, a magneto-optical storage medium, and a nonvolatile memory.

(Base Station)

Figure 11:
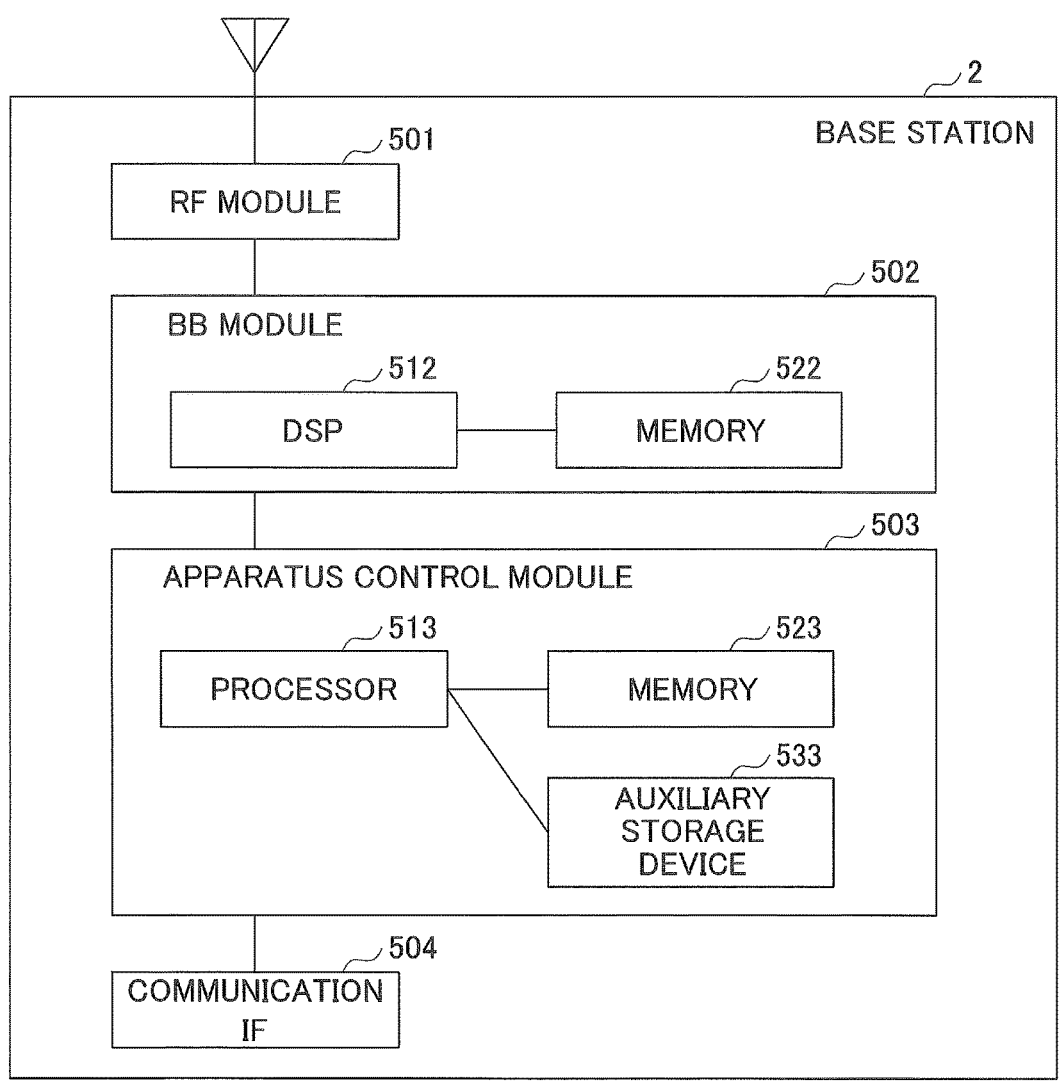
FIG. 11 is a diagram illustrating a hardware configuration example of a base station according to the embodiment.

FIG. 11 is a diagram illustrating a hardware configuration example of the base station according to the embodiment. FIG. 11 illustrates a configuration closer to a mounting example than in FIG. 8. As illustrated in FIG. 11, the base station 2 includes a radio frequency (RF) module 501 that performs a process related to a wireless signal, a baseband (BB) processing module 502 that processes baseband signal, processing an apparatus control module 503 that performs process of a higher layer, and a communication IF 504 that is an interface connected to a network.

The RF module 501 generates a wireless signal to be transmitted from an antenna by performing digital-to-analog (D/A) conversion, modulation, frequency conversion, power amplification, or the like on a digital baseband signal received from the BB processing module 502. The RF module 501 generates a digital baseband signal by performing frequency conversion, analog to digital (A/D) conversion, demodulation, or the like on a received wireless signal and delivers the digital baseband signal to the BB processing module 502. The RF module 501 includes, for example, a part of the communication unit 201 illustrated in FIG. 8.

The BB processing module 502 performs a process of converting an IP packet into a digital baseband signal, and vice versa. A digital signal processor (DSP) 512 is a processor that performs signal processing in the BB processing module 502. The memory 522 is used as a work area of the DSP 512. The BB processing module 502 includes, for example, a part of the communication unit 201 and a part of the communication control unit 202 illustrated in FIG. 8.

The apparatus control module 503 performs protocol processing of an IP layer, operation and maintenance (OAM) processing, or the like. The processor 513 is a processor that performs a process performed by the apparatus control module 503. The memory 523 is used as a work area of the processor 513. An auxiliary storage device 533 is, for example, an HDD and stores various kinds of setting information for operating the base station 2. The apparatus control module 503 includes, for example, a part of the communication unit 201 and a part of the communication control unit 202 illustrated in FIG. 8.

(User Equipment)

Figure 12:
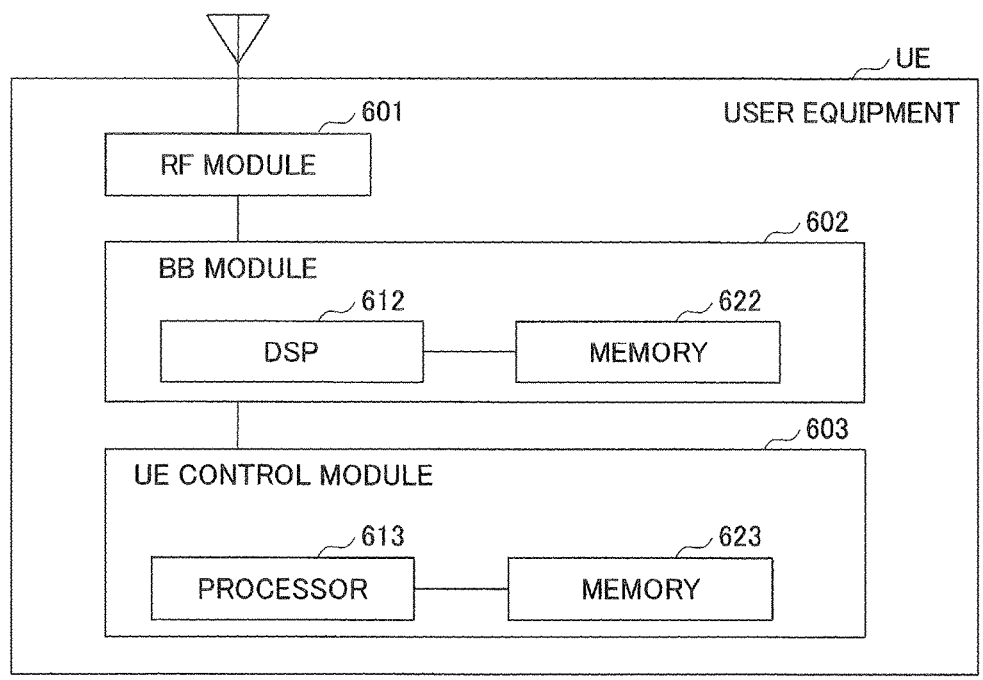
FIG. 12 is a diagram illustrating a hardware configuration example of a user equipment according to the embodiment.

FIG. 12 is a diagram illustrating a hardware configuration example of a user equipment according to the embodiment. FIG. 12 illustrates a configuration closer to a mounting example than in FIG. 9. As illustrated in FIG. 12, the user equipment UE includes an RF module 601 that performs a process related to a wireless signal, a BB processing module 602 that performs baseband signal processing, and a UE control module 603 that performs a process of a higher layer.

The RF module 601 generates a wireless signal to be transmitted from an antenna by performing D/A conversion, modulation, frequency conversion, power amplification, or the like on a digital baseband signal received from the BB processing module 602. The RF module 601 generates a digital baseband signal by performing frequency conversion, A/D conversion, demodulation, or the like on a received wireless signal and delivers the digital baseband signal to the BB processing module 602. The RF module 601 includes, for example, a part of the communication unit 301 illustrated in FIG. 9.

The BB processing module 602 performs a process of converting an IP packet into a digital baseband signal, and vice versa. A DSP 612 is a processor that performs signal processing in the BB processing module 602. The memory 622 is used as a work area of the DSP 612. The BB processing module 602 includes, for example, a part of the communication unit 301 and the measurement unit 303 illustrated in FIG. 9.

The UE control module 603 performs protocol processing of an IP layer and processes of various applications. The processor 613 is a process that performs a process performed by the UE control module 603. The memory 623 is used as a work area of the processor 613. The UE control module 603 includes, for example, a part of the communication unit 301 and the cell switching unit 302 illustrated in FIG. 9.

<Processing Procedure>

Next, a specific processing procedure performed by the wireless communication system according to the embodiment will be described with reference to the drawings.

(Processing Sequence)

FIG. 13 is a sequence diagram illustrating an example of a processing procedure performed by the wireless communication system according to the embodiment.

First, the collection unit 102 of the communication apparatus 1 collects the communication quality information or/and the cell switching history information and stores the communication quality information or/and the cell switching history information in the storage unit 103 (S101). Then, the user equipment UE is assumed to communicate with the base station 2 via any one cell (S102). In the example of FIG. 13, the user equipment UE communicates with the base station 2b via the cell B1.

Subsequently, the determination unit 104 of the communication apparatus 1 determines whether to give an instruction to switch the cell to one cell among the cells overlaid with the cell in which the user equipment UE resides (S103). In the example of FIG. 13, the determination unit 104 is assumed to determine to give the instruction to switch from the cell B1 to the cell C1.

Subsequently, the instruction unit 105 of the communication apparatus 1 instructs the user equipment UE to switch the cell to the cell to the cell determined in the processing procedure of step S103 (S104). The user equipment UE performs the switch to the instructed cell (S105) and communicates with the base station 2 via the switched cell (S106). In the example of FIG. 13, the instruction unit 105 gives an instruction to switch the cell to the cell C1 and the user equipment UE communicates with the base station 2c in the switch to the cell C1.

(Switching Determination Method)

Next, a method in which the determination unit 104 of the communication apparatus 1 determines the switch to the cell in the processing procedure of step S103 of FIG. 13 will be described specifically. The determination unit 104 may determine the switch to the cell in accordance with any method. For example, the determination unit 104 may determine the switch to the cell based on information to be described below.

[Determination Based on Communication Situation (Throughput)]

The determination unit 104 may determine the switch to the cell based on a communication situation of the user equipment UE. Specifically, when the throughput of the user equipment UE is lower than a predetermined threshold, the determination unit 104 may determine the switch to one cell among the cell overlaid with the cell in which the user equipment UE currently resides.

As another example, the determination unit 104 may determine the switch to the cell based on a remaining amount of data to be transmitted to the user equipment UE. When the remaining amount of data to be transmitted to the user equipment UE is large, a situation in which a throughput in the cell is low is estimated. Therefore, there is a possibility of an improvement in the throughput being expected in the switch to the cell. Specifically, when the remaining amount of data to be transmitted to the user equipment UE is greater than a predetermined threshold in the communication apparatus 1 or the base station 2, the determination unit 104 may determine the switch to one cell among the cells overlaid with the cell in which the user equipment UE currently resides.

As still another example, the determination unit 104 may determine the switch to the cell based on a communication situation of the cell in which the user equipment UE currently resides and communication information in another cell overlaid with the cell. Specifically, the determination unit 104 may determine switch to a cell with an average throughput higher than the throughput (the current throughput) of the user equipment UE among the cells overlaid with the cell in which the user equipment UE currently resides.

As a specific example, for example, it is assumed that the user equipment UE resides in the cell B1 and the throughput of the user equipment UE is changed, as illustrated in FIG. 14A. FIG. 14A illustrates the fact that a throughput of 50 Mbps for a seconds to b seconds is deteriorated to 1 Mbps between x seconds to y seconds. It is assumed that an average throughput in the cells other than the cell B1 (an average value of throughputs of the plurality of user equipments UE reside in the cells other the cell B1) continue to be the throughput illustrated in FIG. 5 for a seconds to y seconds. The information illustrated in FIG. 4 is assumed to be stored in the overlay information.

First, the determination unit 104 extracts the cells overlaid with the cell B1 using the overlay information. Here, the cell A1 and the cell C1 are extracted. Subsequently, the determination unit 104 determines whether there is the cell in which the average throughput is greater than the throughput of the user equipment UE by comparing the throughputs of the user equipment UE for the a seconds to b seconds to the average throughputs of the cell A1 and the cell C1 for a seconds to b seconds. The throughput of the user equipment UE is 50 Mbps and the average throughputs in the cell A1 and the cell C1 are 20 Mbps and 15 Mbps, respectively. Accordingly, since there is no cell in which the average throughput is greater than the throughput of the user equipment UE, the determination unit 104 determines that the switch to the cell is unnecessary.

Subsequently, the determination unit 104 determines whether there is the cell in which the average throughput is greater than the throughput of the user equipment UE by comparing the throughputs of the user equipment UE for the x seconds to y seconds to the average throughputs of the cell A1 and the cell C1 for x seconds to y seconds. The throughput of the user equipment UE is 1 Mbps and the average throughputs in the cell A1 and the cell C1 are 20

Mbps and 15 Mbps, respectively. Accordingly, the determination unit 104 determines that the switch to one of the cell A1 and the cell C1 (for example, the cell A1 in which the average throughput is the largest) is performed.

[Determination Based on Communication Situation (Communication Quality)]

The determination unit 104 may determine the switch to the cell based on the communication quality (the communication quality of DL) reported by the user apparatus UE or the communication quality (the wireless quality of UL received from the user equipment UE) measured by the base station 2. Specifically, when the communication quality reported by the user equipment UE or the communication quality measured by the base station 2 is lower than a predetermined threshold, the determination unit 104 may determine switch to one cell among the cells overlaid with the cell in which the user equipment UE currently resides.

The determination unit 104 may estimate an actual throughput of the user equipment UE using communication quality (communication quality of DL) reported periodically by the user equipment UE or communication quality (wireless quality of UL received from the user equipment UE) measured periodically by the base station 2 and may determine switch to a cell in which the average throughput is higher than the estimated actual throughput.

The communication quality reported periodically by the user equipment UE may be, for example, a channel quality indicator (CQI). CQI is an index in which the user equipment UE gives an instruction of a modulation scheme and an encoding speed to the base station 2 to be used in DL to the base station 2. Since the modulation scheme and the encoding speed are decided from a value of CQI, the determination unit 104 may extract the throughput in the user equipment UE based on the modulation scheme and the encoding speed.

When the communication scheme in each cell is a time division duplex (TDD) scheme, the wireless quality of UL is equal to the wireless quality of DL. Accordingly, when the communication scheme is the TDD scheme, the determination unit 104 may estimate the throughput of the user equipment UE from the wireless quality of UL measured by the base station 2.

A specific example of the communication quality reported periodically by the user equipment UE is illustrated in FIG. 14B. For example, when the reported CQI is 15, the determination unit 104 estimates that the actual throughput of the user equipment UE is 50 Mbps. When the reported CQI is 3, the determination unit 104 estimates the actual throughput of the user equipment UE is 1 Mbps. The determination unit 104 determines the switch to the cell in accordance with the same processing procedure as the above-described [Determination Based on Communication Situation (Throughput)] using the estimated throughput.

[Determination Based on Contract Situation]

The determination unit 104 may determine the switch to the cell based on contract information of the user equipment UE. Specifically, when there is a cell designated to be switched preferentially to the cell overlaid with the cell in which the user equipment UE currently resides by contract information of the user equipment UE, the determination unit 104 may determine the switch to the designated cell.

FIG. 15 is a diagram illustrating an example of the contract information. An identifier (for example, IMSI or a subscriber number) uniquely identifying the user equipment UE and a band or a communication scheme with which the user equipment UE is to preferentially reside are stored in the contract information.

For example, it is assumed that an LTE scheme of an 800 MHz bandwidth is used in the cell A1, a 5G scheme of a 10 GHz bandwidth is used in the cells B1 to B3, and a wireless LAN scheme of a 5 GHz bandwidth is used in the cells C1 to C3. When IMSI of the user equipment UE residing in the cell B1 is "A," the determination unit 104 determines the switch to the cell C1 (the wireless LAN scheme) between the cell A1 and the cell C1 overlaid with the cell B1. Similarly, when IMSI of the user equipment UE residing in the cell B1 is "B," the determination unit 104 determines the switch to the cell A1 (the LTE scheme of an 80 MHz bandwidth) between the cell A1 and the cell C1 overlaid with the cell B1.

[Determination Based on Cell Switching History Information]

The determination unit 104 may determine the switch to the cell based on reception quality of the residing cell reported by the user equipment UE and the cell switching history information. Specifically, the determination unit 104 may extract candidates of the switching destination cell stored in the cell switching history information by comparing the reception quality of the residing cell reported by the user equipment UE to the cell switching history information and determine the switch to one cell among the extracted candidates of the switching destination cell.

As a specific example, for example, it is assumed that the residing cell reported by the user equipment UE and the reception quality in the cell are the "cell B1" and "2," respectively, and the information illustrated in FIG. 6A is stored in the cell switching history information. In this case, the determination unit 104 extracts the cell A1 and the cell C1 as the candidates of the switching destination cell and determines the switch to one cell (for example, the cell C1 in which the average throughput is the largest) between the cell A1 and the cell C1.

As another example, the determination unit 104 may determine the switch to the cell based on the reception quality of the residing cell reported by the user equipment UE, the reception quality of a neighboring cell of the residing cell, and the cell switching history information. Specifically, the determination unit 104 may extract candidates of the switching destination cell stored in the cell switching history information by comparing the reception quality of the residing cell reported by the user equipment UE, the reception quality of a neighboring cell (a neighboring cell with the same band as the residing cell), and the cell switching history information and may determine the switch to one cell among the extracted candidates of the switching destination cell.

As a specific example, for example, it is assumed that the residing cell reported by the user equipment UE and the reception quality in the residing cell are the "cell B1" and "2," respectively, the neighboring cell reported by the user equipment UE and the reception quality in the neighboring cell are the "cell B3" and "1," respectively, and the information illustrated in FIG. 6B is stored in the cell switching history information. In this case, the determination unit 104 extracts the cell c1 as the candidate of the switching destination cell and determines the switch to the cell C1.

By determining the switching destination cell based on the cell switching history information, it is possible to determine the switching destination cell based on a past experimental rule in another user equipment UE. When the cell switching history information with the format of FIG. 6B is used, the switching destination cell can be determined by reflecting the position of the user equipment UE before the switching with higher precision than when the switching history information with the format illustrated in FIG. 6A is used.

[Determination Based on Congestion Situation of Cell]

The determination unit 104 may determine the switch to the cell based on a congestion situation of each cell. Specifically, when the determination unit 104 determines that the cells coexist, the determination unit 104 may determine switch to a cell which is not congested among the cells overlaid with the cell in which the user equipment UE currently resides. The determination unit 104 may determine whether each cell is congested, for example, by determining whether the number of user equipments UE of which positions are registered in each cell or the number of user equipments UE of which RRC connection is established in each cell exceeds a predetermined threshold.

(Combination of Switching Determination Methods)

The determination unit 104 may determine the switch to the cell by combining two or more of the plurality of switch determination methods described above.

For example, the determination unit 104 may arbitrarily combine the determination method described in "[Determination Based on Communication Situation (Communication Quality)]" or "[Determination Based on Communication Situation (Communication Quality)]" and the determination method described in "[Determination Based on Contract Situation]" or "[Determination Based on Congestion Situation of Cell]."

In the determination method described in [Determination Based on Communication Situation (Throughput)] or [Determination Based on Communication Situation (Communication Quality)], the switch to one cell among the cells overlaid with the cell in which the user equipment UE currently resides is determined based on the communication situation of the user equipment UE. Accordingly, in a case in which there are the plurality of overlaid cells, the determination unit 104 may determine the switch to the cell which accords with the contract information of the user equipment UE among the plurality of cells. Also, the determination unit 104 may determine the switch to a cell which is not congested among the plurality of cells. When there is a cell which accords with the contract information of the user equipment UE among the plurality of cells, the determination unit 104 may determine the switch to the cell which accords with the contract information of the user equipment UE. When there is a no cell which accords with the contract information of the user equipment UE, the determination unit 104 may determine the switch to the cell which is not congested among the plurality of cells. The cell which is not congested (as in the following description) may be a cell in which the number of user equipments UE of which positions are registered in each cell or the number of user equipments UE of which RRC connection is established in each cell is less than the predetermined threshold.

The determination unit may arbitrarily combine the determination method described in "[Determination Based on Cell Switching History Information]" and the determination method described in "[Determination Based on Contract Situation]" or "[Determination Based on Congestion Situation of Cell]."

In the determination method described in "[Determination Based on Cell Switching History Information]," there is a possibility of a plurality of cells being extracted as candidates of the switching destination cell. Accordingly, when the plurality of cells are extracted as the candidates of the switching destination cell, the determination unit 104 may determine the switch to the cell which accords with the contract information of the user equipment UE among the plurality of cells. The determination unit 104 may determine the switch to a cell which is not congested among the plurality of cells. When there are the cells which accord with the contract information of the user equipment UE among the plurality of cells, the determination unit 104 may determine the switch to the cell which accords with the contract information of the user equipment UE. When there is no cell which accords with the contract information of the user equipment UE, the determination unit 104 may determine the switch to the cell which is not congested among the plurality of cells.

The determination unit 104 may combine the determination method described in determination method described in "[Determination Based on Communication Situation (Throughput)]" or "[Determination Based on Communication Situation (Communication Quality)]" and the determination method described in "[Determination Based on Cell Switching History Information]."

For example, when the candidates of the switching destination cell are extracted using the determination method described in "[Determination Based on Cell Switching History Information]" and the candidates of the switching destination cell may not be extracted (for example, when there is no record which corresponds to the cell switching history information), the determination unit 104 may determine the switching destination cell using the determination method described in "[Determination Based on Communication Situation (Throughput)]" or "[Determination Based on Communication Situation (Communication Quality)]." When a plurality of cells are extracted as the candidates of the switching destination cell, the determination unit 104 may further determine the switching destination cell using the determination method described in "[Determination Based on Contract Situation]" or "[Determination Based on Congestion Situation of Cell]."

(Switch Timing)

To avoid interruption of communication caused in the switching of the cell, the instruction unit 105 may instruct the user equipment UE to perform the switch to the cell at a timing at which the user equipment UE does not perform communication or may instruct the base station 2 to temporarily stop scheduling before the user equipment UE is instructed to perform the switch to the cell.

<Conclusion>

As described above, according to the embodiment, a communication apparatus in a wireless communication system in which a plurality of cells with different bands are overlaid and which includes the communication apparatus and a user equipment includes: an acquisition unit configured to acquire communication quality of the user equipment in a first cell in which the user equipment resides; a determination unit configured to determine whether to perform the switch to a second cell overlaid with the first cell based on the communication quality of the user equipment; and an instruction unit configured to instruct the user equipment to perform the switch to the second cell when the switch to the second cell overlaid with the first cell is determined. There is provided a technology in which the communication apparatus 1 can properly perform the switch to a cell in the wireless communication system in which the plurality of cells are overlaid.

The communication quality of the user equipment may be a throughput of the user equipment for a predetermined period. The determination unit may compare an average throughput in a plurality of other user equipments residing in the second cell to the throughput of the user equipment for the predetermined period and determine the switch to the second cell overlaid with the first cell when the average throughput in the plurality of other user equipments residing the second cell is greater than the throughput of the user equipment for the predetermined period. Thus, the communication apparatus 1 can determine whether to give the instruction to perform the switch to the cell based on the throughput of the user equipment UE. Further, since the communication apparatus 1 can give the instruction to perform the switch to the cell through the self-determination, the user equipment UE is instructed to perform the switch to the cell as in LTE. Therefore, it is not necessary to perform a process of transmitting to the base station a quality measurement result report or the like of the cells with different bands.

The determination unit may estimate the throughput of the user equipment for the predetermined period based on wireless quality of a downlink reported by the user equipment in the first cell. Thus, the communication apparatus 1 can determine whether to given the instruction to perform the switch to the cell based on CQI or the like reported by the user equipment UE. In addition, since the communication apparatus 1 can give the instruction to perform the switch to the cell through the self-determination, the user equipment UE is instructed to perform the switch to the cell as in LTE. Therefore, it is not necessary to perform a process of transmitting to the base station a quality measurement result report or the like of the cells with different bands.

The acquisition unit may acquire contract information of the user equipment. The determination unit may determine whether to perform the switch to the second cell overlaid with the first cell based on the contract information of the user equipment. Thus, the communication apparatus 1 can give the instruction to perform the switch to a cell appropriate for the contract information of the user equipment UE.

The communication apparatus may further include a storage unit configured to store history information in which reception quality of a downlink measured in a switching source cell among the plurality of cells is associated with communication quality in a switching destination cell. The acquisition unit may acquire the reception quality of the downlink in the first cell as the communication quality of the user equipment. The determination unit may extract candidates of the switching destination cell by comparing the reception quality of the downlink acquired by the acquisition unit in the first cell to the history information and select the second cell to which the user equipment is to be switched from the extracted candidates of the switching destination cell. Thus, the communication apparatus 1 can determine the switching destination cell based on a past experimental rule in another user equipment UE.

In the history information, reception quality of a downlink in one or more neighboring cells of the switching source cell may be further associated. The acquisition unit may further acquire reception quality of a downlink in one or more neighboring cells of the first cell from the user equipment. The determination unit may extract the candidates of the switching destination cell by comparing the reception quality of the downlink acquired by the acquisition unit in the first cell, the reception quality of the downlink in the one or more neighboring cells of the first cell, and the history information and selects the second cell to which the user equipment is to be switched from the extracted candidates of the switching destination cell. Thus, when the switching destination cell is determined based on the past experimental rule in another user equipment UE, the position of the user equipment UE before the switching can be reflected with higher precision.

<Supplements of Embodiment>

As described above, the configuration of each device (the communication apparatus 1/the base station 2/the user equipment UE) described in the embodiment of the invention may be realized by causing a CPU (processor) to execute a program in the device including the CPU and a memory or may be realized by hardware such as a hardware circuit including a logic of the process described in the embodiment. Alternatively, the program and the hardware may be mixed.

The embodiments of the invention have been described above, but the disclosed invention is not limited to the embodiments. Those skilled in the art can understand various modifications, corrections, substitutions, replacements, and the like. To promote understanding of the invention, the description has been made using examples of specific numerical values. These numerical values are merely examples and any appropriate values may be used unless otherwise stated. The classification of the items in the foregoing description are not fundamental, but matters described in two or more items may be combined to be used as necessary or matters described in any item may be applied to matters described in other items (unless the matters are inconsistent). The boundaries of the functional units or the processing units in the functional block diagrams may not necessarily correspond to the boundaries of physical components. Operations of the plurality of functional units may be performed physically by one component or an operation of one functional unit may be performed physically by a plurality of components. The procedures of the sequences and the flowcharts described in the embodiments may be switched without being inconsistent. To facilitate the description of the processes, the communication apparatus 1, the base station 2, and the user equipment UE have been described with reference to the functional block diagrams, but the devices may be realized hardware, software, or a combination thereof. Software operated by the processor included in the communication apparatus 1 according to the embodiments of the invention, software operated by the processor included in the base station 2 according to the embodiments of the invention, and software operated by the processor included in the user equipment UE according to the embodiments of the invention may each be stored in any appropriate storage medium such as a random access memory (RAM), a flash memory, a read-only memory (ROM), an EPROM, an EEPROM, a register, a hard disk (HDD), a removable disk, a CD-ROM, a database, and a server.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-048750 filed on Mar. 11, 2016, the entire contents of which are hereby incorporated by reference.

EXPLANATIONS OF LETTERS OR NUMERALS 1 communication device
2 base station
UE user equipment
101 communication unit
102 collection unit
103 storage unit
104 determination unit
105 instruction unit
201 communication unit
202 communication control unit
301 communication unit
302 cell switching unit
303 measurement unit

The invention claimed is:

1. A communication apparatus in a wireless communication system in which a plurality of cells with different bands are overlaid and which includes the communication apparatus and a user equipment, the communication apparatus comprising:
   an acquisition unit configured to acquire communication quality of the user equipment in a first cell in which the user equipment resides;
   a determination unit configured to determine whether to perform switching to a second cell overlaid with the first cell based on the communication quality of the user equipment; and
   an instruction unit configured to instruct the user equipment to perform the switching to the second cell when the switching to the second cell overlaid with the first cell is determined,
   wherein the communication quality of the user equipment is a throughput of the user equipment for a predetermined period,
   wherein the user equipment measures and reports downlink reception quality in the first cell to the communication apparatus, and
   wherein the determination unit estimates the throughput of the user equipment for the predetermined period based on the downlink reception quality in the first cell reported by the user equipment.

2. The communication apparatus according to claim 1, wherein the determination unit compares an average throughput in a plurality of other user equipments residing in the second cell to the throughput of the user equipment for the predetermined period and determines the switching to the second cell overlaid with the first cell when the average throughput in the plurality of other user equipments residing in the second cell is greater than the throughput of the user equipment for the predetermined period.

3. The communication apparatus according to claim 1,
wherein the acquisition unit acquires contract information of the user equipment, and
wherein the determination unit determines whether to perform the switching to the second cell overlaid with the first cell based on the contract information of the user equipment.

4. The communication apparatus according to claim 1, further comprising:
a storage unit configured to store history information in which downlink reception quality measured in a switching source cell among the plurality of cells is associated with communication quality in a switching destination cell,
wherein the acquisition unit acquires the downlink reception quality in the first cell as the communication quality of the user equipment, and
wherein the determination unit extracts candidates of the switching destination cell by comparing the downlink reception quality acquired by the acquisition unit in the first cell to the history information and selects the second cell to which the user equipment is to be switched from the extracted candidates of the switching destination cell.

5. The communication apparatus according to claim 4,
wherein in the history information, downlink reception quality in one or more neighboring cells of the switching source cell are further associated,
wherein the acquisition unit further acquires downlink reception quality in one or more neighboring cells of the first cell from the user equipment, and
wherein the determination unit extracts the candidates of the switching destination cell by comparing the downlink reception quality acquired by the acquisition unit in the first cell, the downlink reception quality in the one or more neighboring cells of the first cell, and the history information and selects the second cell to which the user equipment is to be switched from the extracted candidates of the switching destination cell.

6. The communication apparatus according to claim 2,
wherein the acquisition unit acquires contract information of the user equipment, and
wherein the determination unit determines whether to perform the switching to the second cell overlaid with the first cell based on the contract information of the user equipment.

7. The communication apparatus according to claim 2, further comprising:
a storage unit configured to store history information in which downlink reception quality measured in a switching source cell among the plurality of cells is associated with communication quality in a switching destination cell,
wherein the acquisition unit acquires the downlink reception quality in the first cell as the communication quality of the user equipment, and
wherein the determination unit extracts candidates of the switching destination cell by comparing the downlink reception quality acquired by the acquisition unit in the first cell to the history information and selects the second cell to which the user equipment is to be switched from the extracted candidates of the switching destination cell.

8. The communication apparatus according to claim 3, further comprising:
a storage unit configured to store history information in which downlink reception quality measured in a switching source cell among the plurality of cells is associated with communication quality in a switching destination cell,
wherein the acquisition unit acquires the downlink reception quality in the first cell as the communication quality of the user equipment, and
wherein the determination unit extracts candidates of the switching destination cell by comparing the downlink reception quality acquired by the acquisition unit in the first cell to the history information and selects the second cell to which the user equipment is to be switched from the extracted candidates of the switching destination cell.

\* \* \* \* \*